United States Patent [19]

Shirai et al.

[11] Patent Number: 4,734,903
[45] Date of Patent: Mar. 29, 1988

[54] LEVEL CONTROL CIRCUIT FOR LIGHT BEAM RECORDING APPARATUS

[75] Inventors: Hidemichi Shirai; Yoshio Ozaki, both of Tokyo, Japan

[73] Assignee: Sony Corporation, Tokyo, Japan

[21] Appl. No.: 823,501

[22] PCT Filed: May 23, 1984

[86] PCT No.: PCT/JP84/00262
§ 371 Date: Jan. 21, 1986
§ 102(e) Date: Jan. 21, 1986

[87] PCT Pub. No.: WO85/05486
PCT Pub. Date: Dec. 5, 1985

[51] Int. Cl.$^4$ ............................................... G11B 7/00
[52] U.S. Cl. .................................... 369/107; 369/124; 369/125; 369/119; 358/347; 358/348
[58] Field of Search ............... 369/107, 109, 120, 124, 369/91, 92, 93, 125, 119; 358/347, 348, 345

[56] References Cited

U.S. PATENT DOCUMENTS

| | | |
|---|---|---|
| 4,087,651 | 5/1978 | Taneda et al. |
| 4,184,055 | 1/1980 | Dolby ................... 369/107 |
| 4,355,383 | 10/1982 | Dolby ................... 369/120 |
| 4,549,288 | 10/1985 | Chan .................... 369/107 |
| 4,596,008 | 6/1986 | Beard ................... 369/107 |

FOREIGN PATENT DOCUMENTS

| | | |
|---|---|---|
| 49-90513 | 8/1974 | Japan . |
| 49-97628 | 8/1974 | Japan . |
| 53-84505 | 7/1978 | Japan . |
| 53-116804 | 10/1978 | Japan . |

Primary Examiner—Aristotelis M. Psitos
Attorney, Agent, or Firm—Lewis H. Eslinger

[57] ABSTRACT

This invention is to provided in such an information recording apparatus in which when an exposing locus is formed on a film by irradiating on the film an exposing beam whose width is changed in response to an input audio signal, the average level positions of the exposing locus is controlled in response to the signal level of the input audio signal, a level detector circuit for comparing the input audio signal with a predetermined reference level signal, a continuous circuit for making the compared output from the level detector circuit continuous, a first integrating circuit for integrating the continuous output from the continuous circuit and a second integrating circuit for integrating the integrating outputs from the first integrating circuit and delivering the same as the average level position signals used upon the exposure and recording. According to the present invention, it is possible to effectively remove the sharp inflection point on a waveform of a level detecting signal without causing an over-modulation.

8 Claims, 22 Drawing Figures

FIG. 7 PRIOR ART
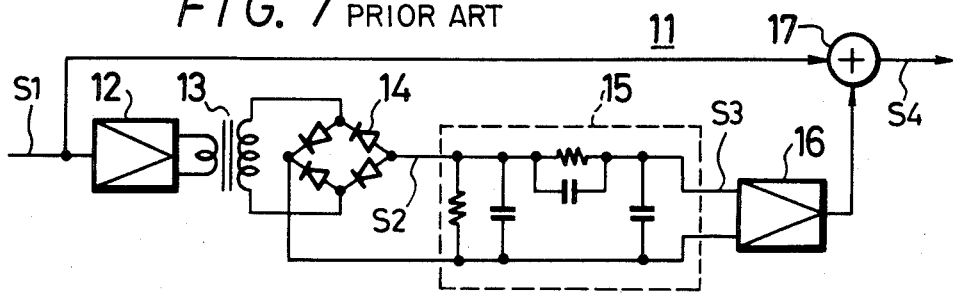
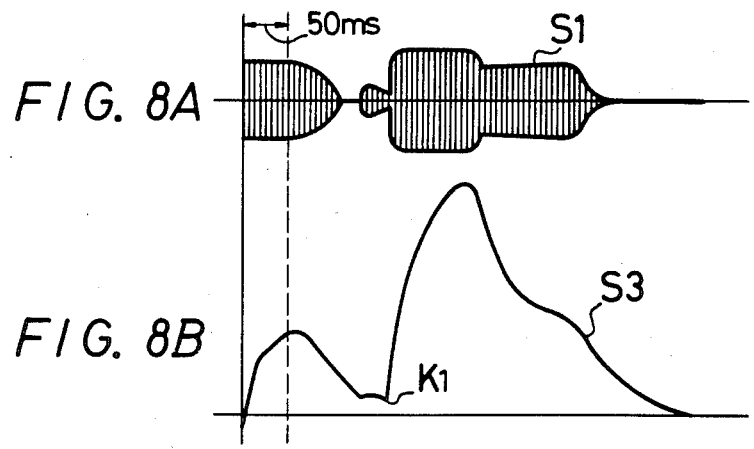
FIG. 8A
FIG. 8B
FIG. 9
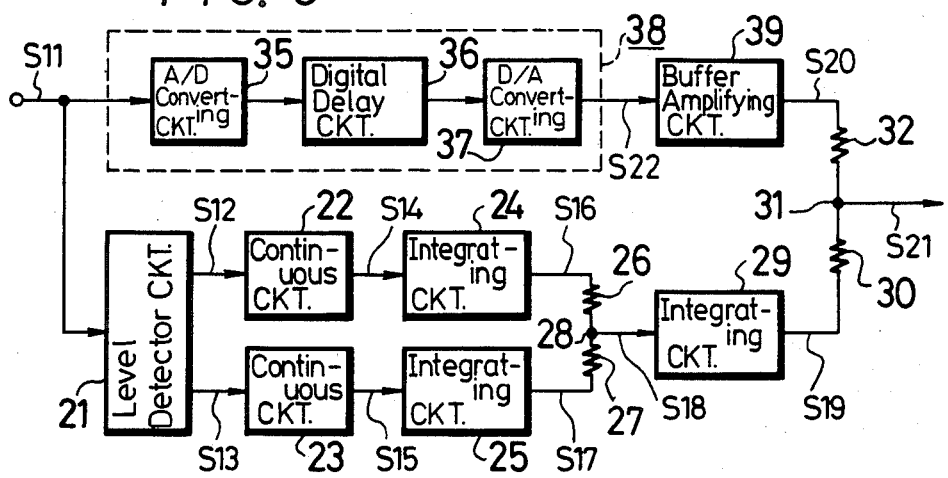

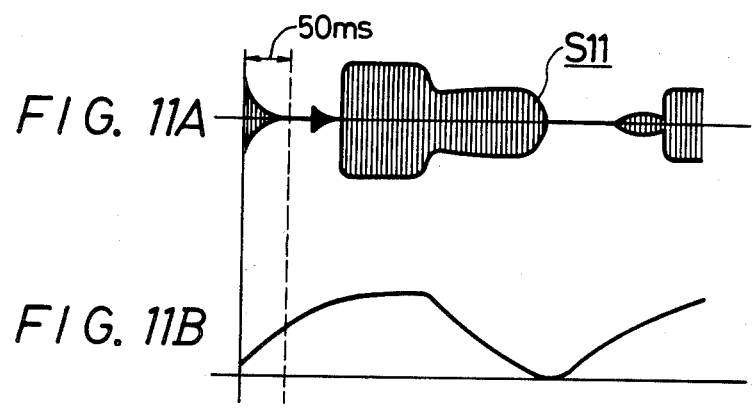
FIG. 11A
FIG. 11B
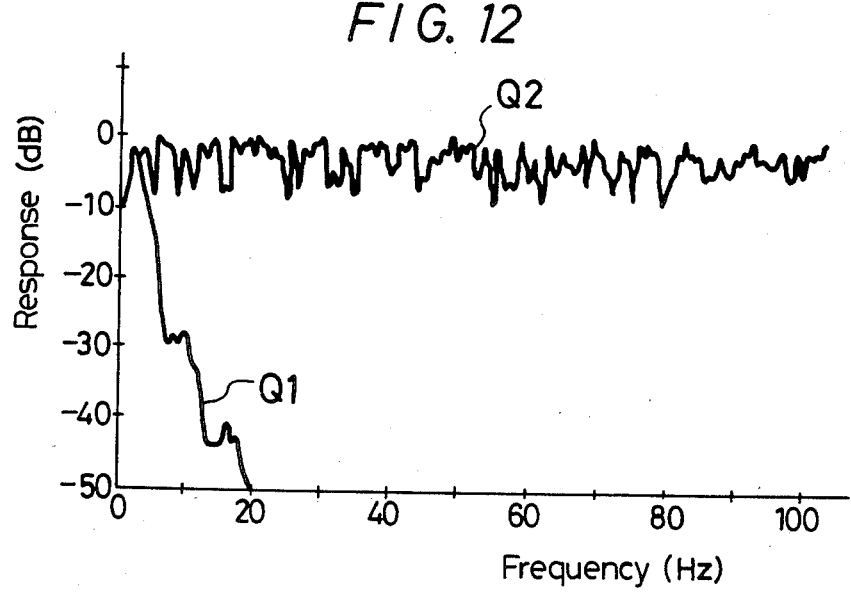
FIG. 12

LEVEL CONTROL CIRCUIT FOR LIGHT BEAM RECORDING APPARATUS

DESCRIPTION

TECHNICAL FIELD

The present invention relates to an information recording apparatus suitable for being applied to a case in which an optical film is exposed in response to an electrical input signal and then a recording is carried out thereon.

BACKGROUND ART

The information recording apparatus of this kind is used to record an audio signal on a sound track of, for example, a cinema film. As shown in FIG. 1, an optical image 1 having a triangular cross-section is irradiated through a light irradiating apparatus that includes a galvanometer on a linear-shaped slit 2 and the galvanometer is driven by an electrical audio signal to vibrate the optical image 1 in the direction shown by an arrow 3, whereby a scanning optical beam 4 of which the width is modulated in response to the audio signal is delivered via the slit 2. As shown in FIG. 2, when a cinema film is transported, this scanning optical beam 4 exposes and scans a sound track 5 to record on a sound track 5 an exposed locus 6 whose exposed area is changed with a central line X1 of the sound track 5 as the center.

The film thus exposed is chemically fixed with the result that the exposed locus 6 forms a transparent portion 7A and that the boundary between the transparent portion 7A and an opaque portion 7B draws a recording waveform 8 corresponding to the change of the audio signal.

By the way, when an information is recorded as described above, if the average level positions of the recording waveform 8 are fixed to the positions of, for example, lines X21, X22 in FIG. 2 and the recording waveform 8 is recorded with the average level positions X21 and X22 as the center even when the level of the audio signal is large (FIG. 3) or small (FIG. 4). Because the area of the transparent portion 7A is increased when the level of the audio signal is small, there occurs a problem that offensive noise based on scratches on the film and dust adhered to the film is mixed into the reproduced signal as a background noise. To solve this problem, a prior art background noise reduction circuit 11 shown in FIG. 7 is employed, in which the average level positions X21 and X22 of the recording waveform 8 are changed in response to the level of the audio signal so that when the signal level of the audio signal is small, the average level positions are made closer to the central line X1 as shown in FIG. 5, while when the signal level of the audio signal is increased, they are made distant from the central line X1 as shown in FIG. 6.

The background noise reduction circuit 11 supplies an input audio signal S1 through an input amplifier circuit 12 and a transformer 13 to a full wave rectifying circuit 14. A rectified output S2 therefrom is smoothed by a smoothing circuit 15, that generates a level detecting signal S3 corresponding to the signal level of the input audio signal S1 at the output terminal thereof. This level detecting signal S3 is supplied through an inverting amplifying circuit 16 to an adding circuit 17 in which it is added to the input audio signal S1. The resultant added output is delivered to the galvanometer as an average level position signal S4.

In the circuit arrangement shown in FIG. 7, if the signal level of the input audio signal S1 is decreased, the level detecting signal S3 is also decreased, increasing the average level position signal S4. Thus, the average level positions X21 and X22 of the recording waveform 8 on the sound track 5 are changed so as to approach the central line X1 as shown in FIG. 5. Conversely, if the signal level of the input audio signal S1 is increased, the level detecting signal S3 is increased, decreasing the average level position signal S4. Thus, the average level positions X21 and X22 of the recording waveform 8 on the sound track 5 are changed so as to come away from the central line X1 as shown in FIG. 6.

Consequently, when the input audio signal S1 as shown in FIG. 8A arrives, this signal is full-wave rectified by the full wave rectifying circuit 14 of the ground noise reduction circuit 11 and then smoothed by the smoothing circuit 15, resulting in the level detecting signal S3 (FIG. 8B) whose signal level is changed with a delay of substantially 20 [m sec] relative to the signal level change of the audio signal S1. Thus, in accordance with the change of the signal level of the audio signal S1, the average level positions X21 and X22 of the recording waveform 8 on the sound track 5 are corrected so that when the signal level is small, the exposed area of the exposed locus 6 is reduced, thus reducing the occurrence of the background noise in advance. The prior art circuit arrangement shown in FIG. 7, however, has the following defects and hence does not yet function satisfactorily as a background noise reduction circuit 11.

The first defect is such one that as to the the waveform of the level detecting signal S3 derived from the smoothing circuit 15, when the signal level of the input audio signal S1 is rapidly changed, the waveform of the level detecting signal S3 is not changed smoothly in correspondence therewith and hence there appears a sharp inflection point portion K1. When the level detecting signal S3 is changed rapidly as mentioned above, the amplitude of the recording waveform 8 on the sound track 5 is rapidly moved and at the same time, the average level positions X21 and X22 are rapidly moved so as to come away from the central line X2. Therefore, the recording waveform 8 is distorted. If this distorted waveform is reproduced, pop noise heard as "buchi" or "pu" appears in the reproduced sound. By the way, when the sound begins to emanate, since the signal level of the input audio signal S1 rapidly rises up frequently, such pop noise frequently occurs and hence the tone quality is deteriorated.

The second defect is such one that when the signal level of the input audio signal S1 is changed, the change of the level detecting signal S3 derived from the smoothing circuit 15 in response to such change is with a delay of about 20 msec. Accordingly, when the signal level of the input audio signal S3 is increased, the movement of the average level positions X21 and X22 of the recording waveform 8 is delayed by the response delay time, resulting in an over-modulation state. As a result, the recording waveform 8 corresponding to the rising-up portion of the signal level of the input audio signal S1 is distorted so that a reproduced signal faithful to the input audio signal S1 can not be obtained.

Further, the third defect is such that the frequency characteristic of the circuit arrangement shown in FIG. 7 presents, when a white noise is applied to the input terminal thereof, such a characteristic that the frequency component of 20 to 60 Hz is attenuated by about 20 to 40 dB and then remained. Accordingly, there is brought about such a result that this low frequency component is superimposed upon the audio signal, recorded and reproduced and thereby the reproduced signal is distorted. By the way, in order to avoid this defect, it may be considered that the cut-off frequency of the smoothing circuit 15 is selected to be low. If this proposal is realized, the response characteristic is delayed more with the result that the aforesaid second defect is fostered. This is not desirable.

In view of the above mentioned point, the present invention is intended to provide an information recording apparatus which effectively removes the sharp inflection point of the waveform of the level detecting signal without causing the over-modulation due to the delay of the response and hence which is free from the above defect.

DISCLOSURE OF INVENTION

This invention is to provide in such an information recording apparatus in which when an exposed locus is formed by irradiating on a film an exposing beam whose width is changed in response to an input audio signal, average level positions of the exposed locus are controlled in accordance with the signal level of the input audio signal, a level detector circuit for comparing the input audio signal with a predetermined reference level signal, a continuous circuit for making the compared output from the level detector circuit continuous, a first integrating circuit for integrating the continuous output from the continuous circuit and a second integrating circuit for integrating the integrated output from the first integrating circuit and delivering its output as the average level position signal upon exposing and recording. According to the present invention, it is possible to effectively remove a sharp inflection point of the waveform of the level detecting signal without causing any over-modulation due to the delay of response.

BRIEF DESCRIPTION OF DRAWINGS

FIG. 7 is a schematic circuit diagram showing a prior art background noise reduction circuit, FIGS. 8A and 8B are signal waveform diagrams showing signals at respective sections thereof, FIG. 9 is a block diagram showing an embodiment of an information recording apparatus according to the present invention, FIGS. 10A–10I are signal waveform diagrams showing signals at the respective sections thereof and FIGS. 11A, 11B and 12 are respectively a signal waveform diagram and a frequency characteristic graph useful for explaining the effects of the invention.

BEST MODE FOR CARRYING OUT THE INVENTION

Figure 1:
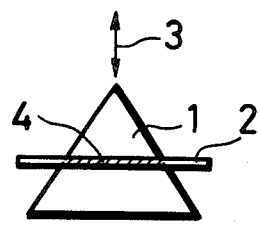
FIGS. 1 to 6 are schematic diagrams useful for explaining a prior art exposing and recording system.
Figure 2:
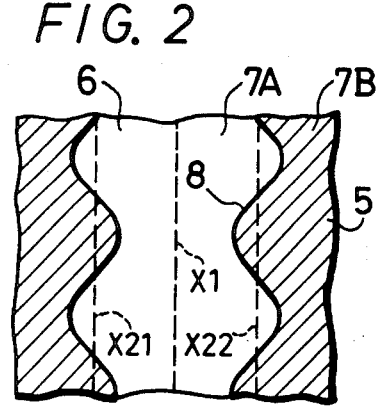
Figure 3:
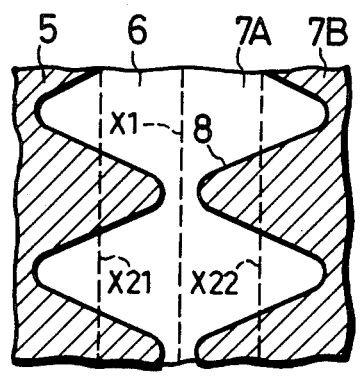
Figure 4:
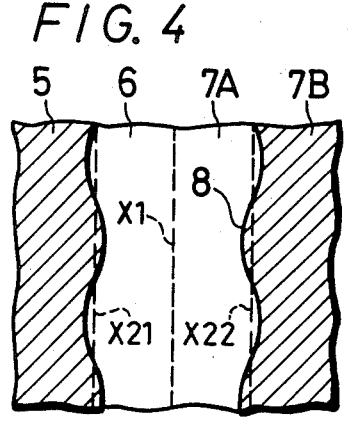
Figure 5:
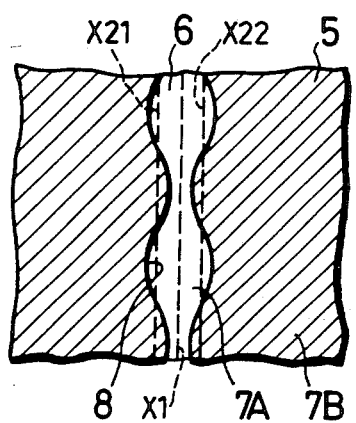
Figure 6:
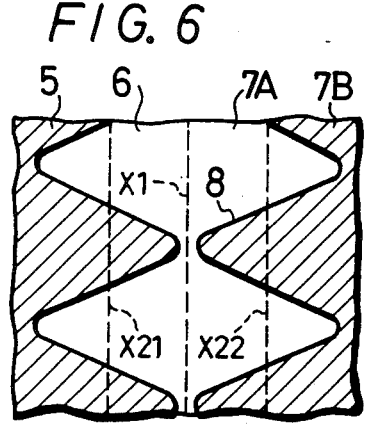
Figure 10A:
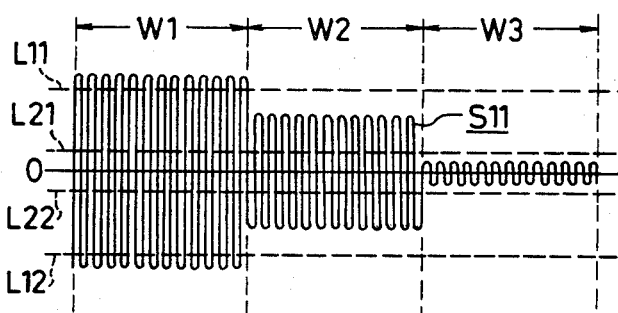
Figure 10B:
Figure 10C:

An embodiment of an information recording apparatus according to the present invention will be described hereinafter with reference to the drawings. In FIG. 9, reference numeral 21 designates a level detector circuit which compares an input audio signal S11 with large level reference signals L11, L12 and small level reference signals L21 and L22 as shown in FIG. 10A and produces a level detecting signal S12 which, when the signal level of the input audio signal S11 is large, rises up to a logic "H" level during an interval in which the input audio signal S11 is higher than the positive large level reference signal L11 and the input audio signal S11 is lower than the negative large level reference signal L12 and which falls down to a logic "L" level in other intervals as shown in FIG. 10B, and further produces a small level detecting signal S13 which, when the signal level of the input audio signal S11 is large or at intermediate level, rises up to the logic "H" level during an interval in which the input audio signal S11 is higher than the positive small level reference signal L21 and the input audio signal S11 is lower than the negative small level reference signal L22 and which falls down to the logic "L" level in other intervals as shown in FIG. 10C Accordingly, as shown in FIG. 10A, when the audio signal S11 lies in a large signal level interval W1 (when the amplitude of the audio signal S11 lies within a level range exceeding the large level reference signals L11 and L12), the pulse of the logic "H" is sequentially delivered as the large level detecting signal S12 and the small level detecting signal S13 (FIGS. 10B and 10C). Further, when the audio signal S11 lies in an intermediate signal level W2 (when the amplitude of the audio signal S11 lies in a level range between the large level reference signals L11, L12 and the small level reference signals L21, L22), the pulse of the logic "H" level is sequentially delivered as the small level detecting signal S13 (FIG. 10C), while the large level detecting signal S12 maintains the logic "L" level (FIG. 10B). Furthermore, when the audio signal S11 lies in a small signal level interval W3, the large level detecting signal S12 and the small level detecting signal S13 maintain the logic "L" level (FIGS. 10B and 10C).

Figure 10D:
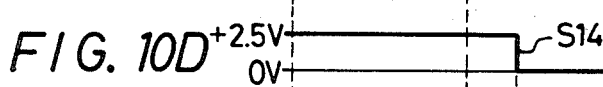

The large level detecting signal S12 and the small level detecting signal S13 are respectively supplied to continuous circuits 22 and 23 of retriggerable monostable multivibrator arrangement. When the respective pulses are delivered as the large level detecting signal S12 and the small level detecting signal S13, the continuous circuits 22 and 23 are repeatedly triggered by, for example, each trailing edge thereof. In consequence, when the pulse is supplied thereto as the large level detecting signal S12, the continuous circuit 22 generates a continuous signal S14 (FIG. 10D) which becomes a positive potential (for example, +2.5 V) corresponding to the logic "H" level and which becomes, when no pulse is supplied thereto as the large level detecting signal S12, a potential (for example, 0 V) corresponding to the logic "L" level.

Whereas, the continuous circuit 23 generates a continuous signal S15 (FIG. 10F) which, when the pulse is supplied thereto as the small level detecting signal S13, becomes a potential (for example, 0 V) corresponding to the logic "H" level and which, when no pulse is supplied thereto as the small level detecting signal S13, becomes a negative potential (for example, −5.0 V) corresponding to the logic "L" level.

These continuous signals S14 and S15 are supplied to first stage integrating circuits 24 and 25, respectively. The integrating circuits 24 and 25 include amplitude limiter circuits so that an integrating output S16 from the integrating circuit 24 maintains an amplitude limiting value N1 as shown in FIG. 10E when the continuous signal S14 is at the logic "H" level (that is, +2.5 V) and maintains 0 V as the central level when the continuous signal S14 is at logic "L" level (that is, 0 V), while an integrating output S17 from the integrating circuit 25 maintains 0 V as the central level as shown in FIG. 10G when the continuous signal S15 is at the logic "H" level (that is, 0 V) and maintains an amplitude limiting value N2 when the continuous signal S15 is at logic "L" level (that is, −5 V).

Figure 10E:
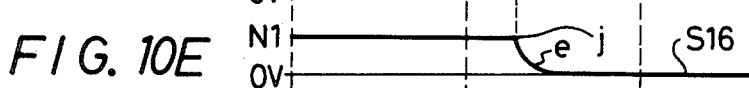
Figure 10F:
Figure 10G:
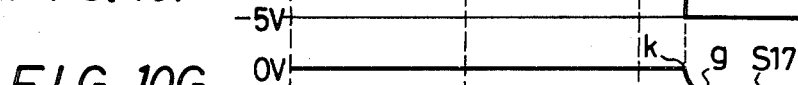

On the other hand, when the continuous signals S14 and S15 fall down from the logic "H" level to the logic "L" level or rises up from the logic "L" level to the logic "H" level, the integrating outputs S16 and S17 from the integrating circuits 24 and 25 draw changing curves e and g which fall down or rise up exponentially (FIGS. 10E and 10G).

Figure 10H:
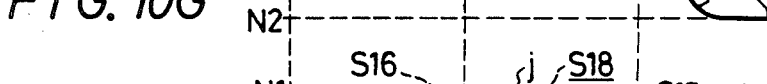

These integrating outputs S16 and S17 are supplied through resistors 26 and 27 to an adding point 28 in which they are added to each other, whereby an added output S18 which results from combining the integrating outputs S16 and S17 with each other through the central level (0 V) as shown by the broken line in FIG. 10H. This added output is supplied to a second stage integrating circuit 29.

This second stage integrating circuit 29 integrates the values at respective time points of the added output S18 and then produces a second stage integrating output S19 which, as shown by the solid line in FIG. 10H, maintains 0 V when the added output S18 becomes equal to the central level of 0 V; increases rectilinearly at the time of the first limiting value N1; secondarily integrates the first limiting value N1 when it is falling down (or conversely rises up) from the first limiting value to the central level exponentially; secondarily integrates the second limiting value N2 when it falls down (or conversely rises up) from the central level to the second limiting value exponentially; and decreases rectilinearly at the time of the second limiting value N2.

The second stage integrating output S19 is supplied through a resistor 30 to an adding point 31 at which it is added with an audio signal S20 supplied through a resistor 32 to the adding point 31 and then delivered as a drive signal S21, which will be fed, for example, to the galvanometer. The input audio signal S11 is delayed by a delay circuit 38 formed of an analog-to-digital converting circuit 35, a digital delay circuit 36 and a digital-to-analog converting circuit 37. A delayed output S22 therefrom is developed as an audio signal S20 via a buffer amplifying circuit 39. The delay amount of the delay circuit 38 is determined to be a value substantially equal to the delay amount of the average level position signal S19 delayed from the input audio signal S11 mainly by the first stage integrating circuits 24 and 25 and the second stage integrating circuit 29.

Consequently, on the film 40, there is formed an exposing locus 42 by exposing a recording waveform 41 with average level positions X41 and X42 as the centers which symmetrically change across a central line X3 in response to the average level position signal S19 derived from the second integrating circuit 29.

In the aforesaid circuit arrangement, if the signal level of the input audio signal S11 is changes from a large level to an intermediate level and a small level as shown in the intervals W1, W2 and W3 of FIG. 10A, the level detector circuit 21 is operated in correspondence therewith such that the output S14 from the continuous circuit 22 is changed in the manner of the logic "H" level (+2.5 V), logic "L" level (0 V) and logic "L" level (0 V) (FIG. 10D), and also that the output S15 from the continuous circuit 23 is changed in the manner of the logic "H" level (0 V), logic "H" level (0 V) and logic "L" level (−5 V) (FIG. 10F). Accordingly, the output S16 from the first stage integrating circuit 24 is changed from the first limiting value N1 to the central level (0 V) and the central level (0 V) (FIG. 10E), whilst the output S17 from the integrating circuit 25 is changed from the central level (0 V) to the central level (0 V) and the second limiting value N2 (FIG. 10G).

When the outputs S16 and S17 (FIGS. 10E and 10G) from the integrating circuits 24 and 25 are respectively moved from the interval W1 to the interval W2 and from the interval W2 to the interval W3, they are respectively shifted from the first limiting value N1 to the central value and from the central value to the second limiting value N2. In this case, they fall down exponentially. Accordingly, waveform portions j and k upon such transition form inflection points which are changed sharply.

The integrating outputs S16 and S17 having such inflection points j and k are added to each other at the adding point 28, generating the added output S18 (FIG. 10H) which changes from the first limiting value N1 to the central value (0 V) and the second limiting value N2, sequentially. This added output is integrated by the second stage integrating circuit 29. Of the integrated output S19, the portions corresponding to the limiting values N1 and N2 are rectilinearly increased and decreased, while the portion corresponding to the central value (0 V) maintains a constant value.

Figure 10I:
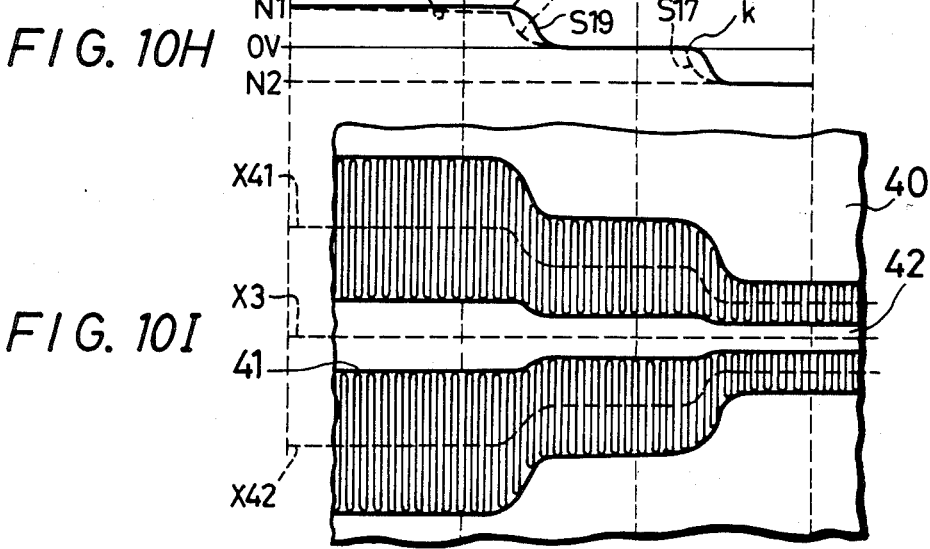

On the other hand, of the integrated output S19, the portions corresponding to the waveform portions which fall down exponentially are integrated twise. As a result, the changes of the waveform portions j and k forming the inflection points are made dull so that they have lost the sharpness and are changed smoothly Therefore, since the movement of the average level positions X41 and X42 upon making the exposure recording on the film 40 is carried out on the basis of the integrating output S19 which change smoothly (FIG. 10I), no rapid change occurs in the change of the recording waveform 41 of the exposing locus 42. Therefore, there is no fear that a distortion causing a pop noise in the reproduced audio signal is formed.

While in the aforesaid case the signal level of the input audio signal S11 is sequentially lowered in the order of the large level, the intermediate level and the small level, the information recording apparatus of the invention can be similarly operated without causing the pop noise in a case where it is increased in the opposite direction or a case where it is directly changed between the large level and the small level without passing through the intermediate level. As, for example, shown in FIG. 11A, in the case where the input audio signal S11, whose level change is sharp, arrives similarly to FIG. 8, the average level position signal S19 developed at the output terminal of the second stage integrating circuit 29 becomes such one that when the signal level of the input audio signal S11 is changed sharply the waveform portion thereof corresponding to the change becomes smooth as shown in FIG. 11B, thus preventing the pop noise from occurring in the reproduced audio signal.

Further, since the change of the average level position signal S19 becomes smooth, the frequency characteristic thereof is presented such that as shown by a curve Q1 in FIG. 12, the frequency component of 20 Hz is reduced by about 50 dB when a white noise shown by a curve Q2 is inputted thereto. Accordingly, it is possible to prevent in advance the occurrence of the distortion (for example, a mixed and modulated distortion which may occur when the audio signal S20 is superimposed upon the average level position signal S19) in the reproduced signal.

Furthermore, since the timing at which the level of the input audio signal S11 is changed can properly be matched with the timing at which the average level position signal S19 is changed by the delay circuit 38, it is possible to effectively remove a fear that the overmodulation occurs in the exposing locus 42. Accordingly, if like the embodiment shown in FIG. 9 the retriggerable monostable multivibrator is employed as the continuous circuits 22 and 23, when from the level detector circuit 21 there are not obtained the pulses as the large level detecting signal S12 and the small level detecting signal S13 (this means that the level of the input audio signal S11 is rapidly changed in the upper or lower direction), the continuous circuits are always triggered by the final pulse so that the timing at which the level of the input audio signal S11 is changed and the timings at which the continuous signals S14 and S15 fall down are always determined by the limited operation time of the monostable multivibrators, thus facilitating the timing adjustment, which will avoid the overmodulation. By the way, if the continuous circuits of retriggerable monostable multivibrator type are not employed, the falling-down of the continuous signals are not made constant but are scattered, so that there is a fear that the timings will not be matched with each other, thus causing the over-modulation.

While in the above description the present invention is applied to a case where the exposure and recording are carried out by using the optical beam, this invention is not limited to such case but can be widely applied to cases, such as when the exposure and recording are carried out by using a laser beam and an electron beam, etc.

According to the present invention as set forth above, the signal level detecting signal corresponding to the change of the signal level of the input audio signal is generated from the two stage integrating circuits, so that when the average level positions are moved in response to the change of the signal level detecting signal upon exposure and recording, the exposure and recording can be carried out without causing the pop noise. Further, since the signal level detecting signal is changed smoothly as described above, it is possible to provide the information recording apparatus which can provide a frequency characteristic capable of preventing an undesired distortion and which can match the timing of the signal level detecting signal and the timing of the input audio signal.

What is claimed is:

1. An information recording apparatus in which an exposing locus is formed on a film by irradiating the film with an exposing beam, in which the width of the exposing locus is changed in response to an input audio signal, and in which an average level position of said exposing locus is controlled in response to the signal level of said input audio signal, characterized by a level detector circuit for comparing said input audio signal with a predetermined reference level signal, a continuous circuit for making a compared output from said level detector circuit continuous, a first integrating circuit for integerating the continuous output from said continuous circuit and a second integrating circuit for integrating an integretated output from said first integrating circuit and delivering a twice integrated signal to control said average level position of said exposing locus upon the exposure and recording.

2. An information recording apparatus according to claim 1, further comprising means for combining said input audio signal and said twice integrated signal for producing a combined output signal for changing said width of said exposing locus.

3. An information recording apparatus according to claim 2, in which said means for combining comprises an adding point having fed thereto said input audio signal through a first resistor and said twice integrated signal through a second resistor for producing said combined output signal.

4. An information recording apparatus according to claim 1, in which said continuous circuit comprises monostable multivibrator means.

5. An information recording apparatus according to claim 1, wherein said level detector compares said input audio signal to a large reference level signal and a small reference level signal and produces a large compared output signal and a small compared output signal, respectively, both being fed to said continuous circuit.

6. An information recording apparatus according to claim 5, wherein said continuous circuit comprises first and second monostable multivibrators receiving said large reference signal land said small reference singal, output signals of said first and second multivibrators being fed to said first integrating circuit.

7. An information recording apparatus according to claim 1, further comprising time delay means receiving said audio input signal and means for combining connected to receive a time delayed audio input signal and said twice integrated signal for producing a combined output signal for changing said width of said exposing locus.

8. An information recording apparatus according to claim 7, in which said time delay means comprises abseries connected analog-to-digital converting circuit, a digital delay circuit, and a digital-to-analog converting circuit.

* * * * *

UNITED STATES PATENT AND TRADEMARK OFFICE
CERTIFICATE OF CORRECTION

PATENT NO. : 4,734,903

DATED : March 29, 1988

INVENTOR(S) : Hidemichi Shirai & Yoshio Ozaki

It is certified that error appears in the above-identified patent and that said Letters Patent is hereby corrected as shown below:

Column 2, line 31, delete "yet".

Column 5, line 57, delete "is".

IN CLAIMS

Column 8, line 11, change "integretated" to --integrated--;

line 38, change "singal" to --signal--.

Signed and Sealed this

Twenty-fifth Day of October, 1988

Attest:

DONALD J. QUIGG

Attesting Officer

Commissioner of Patents and Trademarks